INVENTORS
WALTER F. KOSONOCKY &
LUBOMYR S. ONYSHKEVYCH
BY
Morris A. Rabkin
ATTORNEY

READOUT CIRCUIT FOR PARAMETRIC OSCILLATOR

Filed Oct. 16, 1958 3 Sheets-Sheet 2

INVENTORS
WALTER F. KOSONOCKY &
LUBOMYR S. ONYSHKEVYCH
BY [signature]
ATTORNEY

INVENTORS
WALTER F. KOSONOCKY &
LUBOMYR S. ONYSHKEVYCH
BY Morris A. Rabkin
ATTORNEY United States Patent Office 3,084,335

Patented Apr. 2, 1963

3,084,335
READOUT CIRCUIT FOR PARAMETRIC OSCILLATOR

Walter F. Kosonocky, Newark, and Lubomyr S. Onyshkevych, Princeton, N.J., assignors to Radio Corporation of America, a corporation of Delaware Filed Oct. 16, 1958, Ser. No. 767,609
9 Claims. (Cl. 340—173.2)

This invention relates to novel methods of and improved apparatus for storing information signals using non-linear reactance circuits.

It is known that parametric oscillations can be established in a resonant circuit including a non-linear reactance. The non-linear reactance may be magnetic such as a ferromagnetic core, or may be capacitive such as a ferroelectric condenser, a variable capacity diode, and so on. It is also known that the phase of the resonant circuit oscillations can be controlled by means of an additional control signal applied to the resonant circuit. When used in digital systems, two mutally opposite phases are used to represent the two binary information signals "1" and "0."

An object of the present invention is to provide improved storage systems using parametric oscillator circuits.

Another object of the present invention is to provide improved random access memory systems using parametric circuit as the storage elements.

Still another object of the present invention is to provide novel methods of an apparatus for storing information signals using parametric circuits.

According to the present invention, a plurality of parametric circuits are used to store a plurality of information signals. Means are provided for the selective switching of a desired one of the plurality of parametric circuits for writing information into and reading information out of that one circuit.

Among the features of the invention are included means for reading the stored information non-destructively from a desired one of the circuits.

Figures 1, 2, 3, 4:
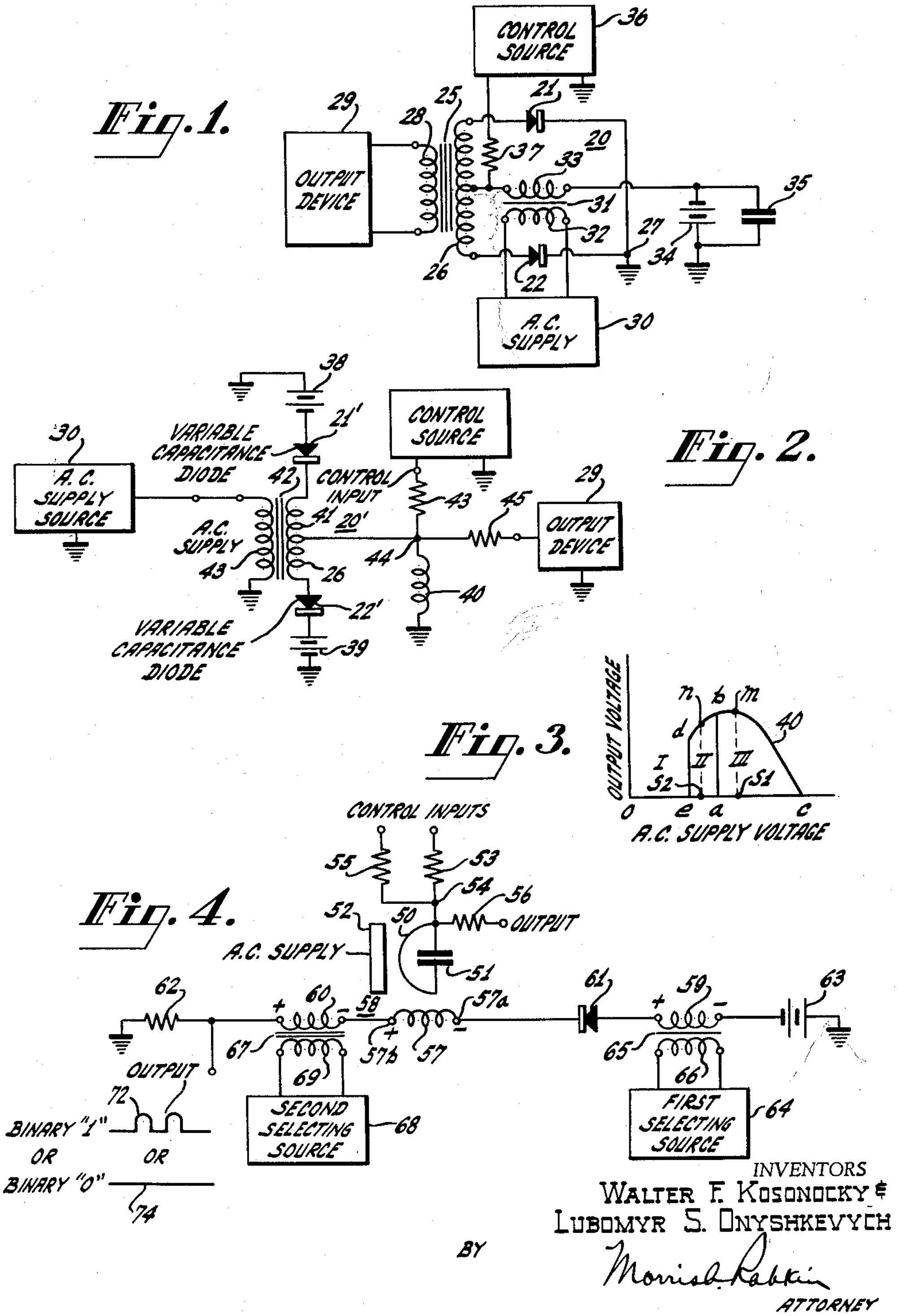
FIGS. 1 and 2 are, respectively, schematic diagrams of two different forms of parametric circuits useful in the present invention.
FIG. 3 is a graph of the response characteristics of the parametric circuit of FIG. 1 as a function of supply voltage amplitude.
Figure 5:
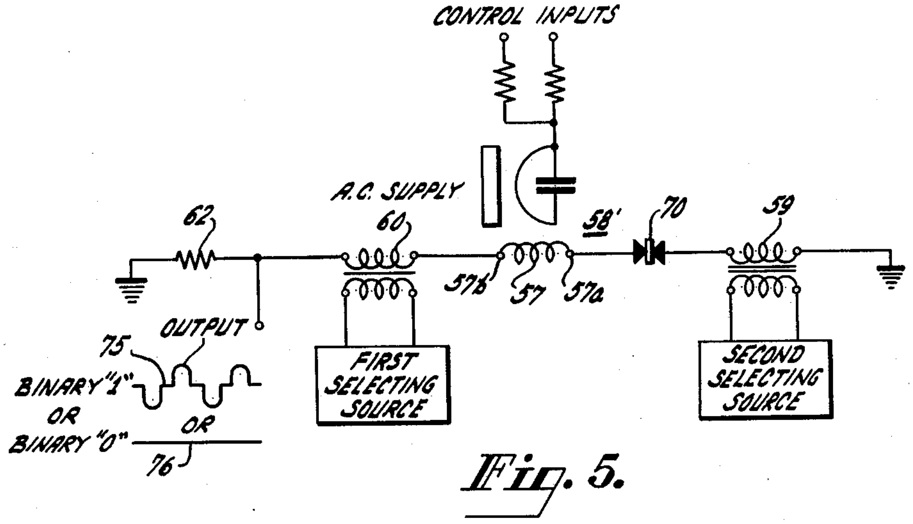
Figure 6:
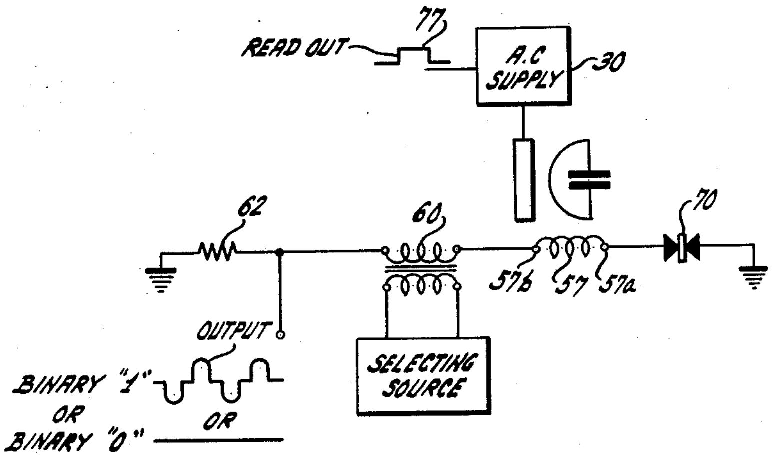
Figure 7:
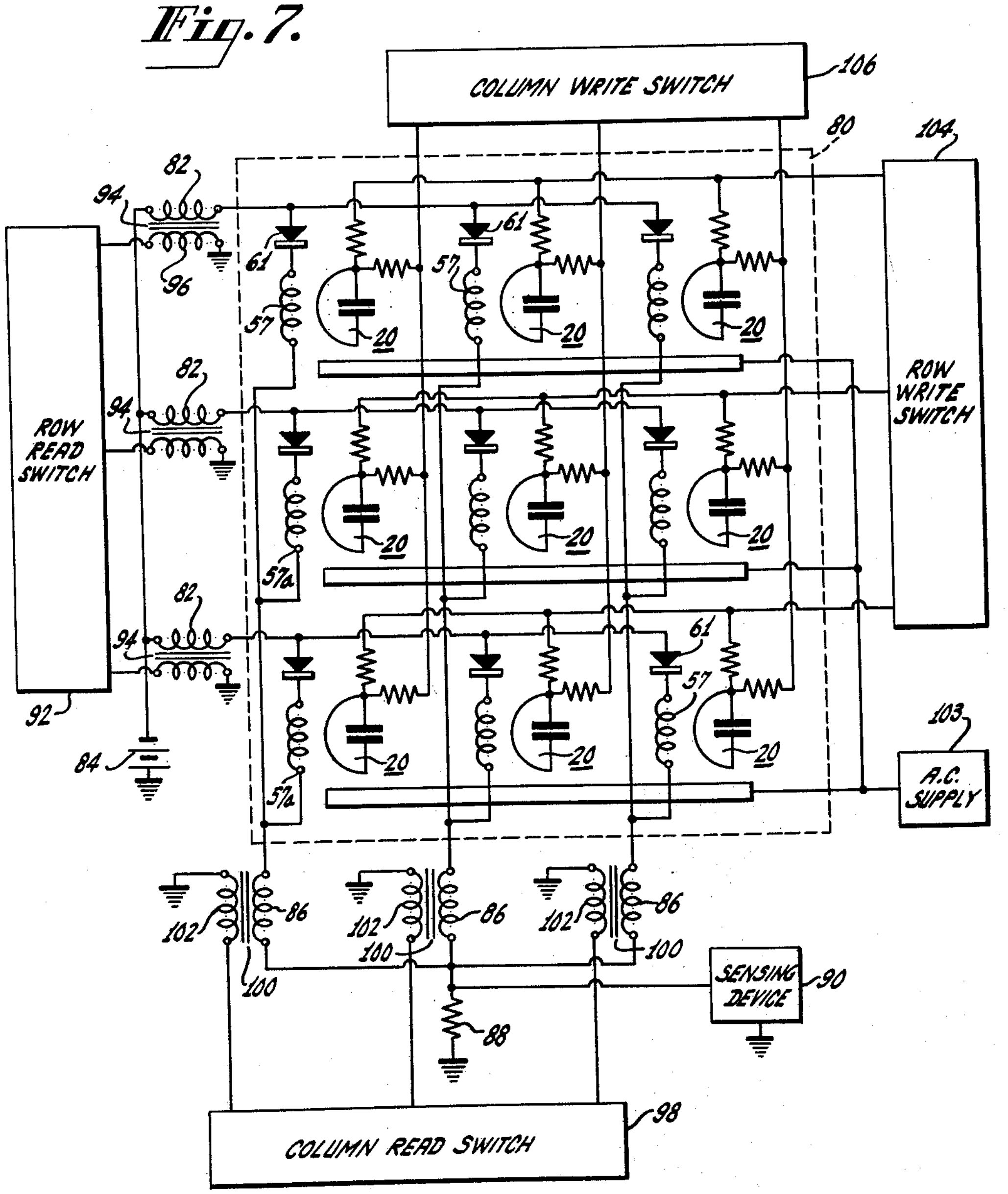

FIGS. 4, 5, and 6 are, respectively, schematic diagrams of three different selective reading circuits useful in the present invention;

FIG. 7 is a schematic diagram of a memory system according to the invention.

The parametric oscillator circuit 20 of FIG. 1 has a pair of junction diodes 21, 22 connected in back-to-back relation between the center-tap of the primary winding 26 of a transformer 25 and a common junction point 27. The junction point 27 is connected to a point of common reference potential, indicated in the drawings by the conventional ground symbol. The output signals from the circuit 20 are taken across the secondary winding 28 of the transformer 25. An output device 29 responsive to the signals from the oscillator circuit 20 is coupled to the secondary winding 28 of the transformer 25. The output device, for example, may be a phase discriminating circuit, another parametric oscillator circuit, and so on. An A.C. (alternating current) supply source 30 is transformer coupled to the oscillator circuit 20 by way of the primary and secondary windings 32 and 33 of an input transformer 31. The secondary winding 33 has one end terminal connected to the center-tap of the winding 26, and has the other end terminal connected to ground via a bias source, shown as a battery 34. The bias battery 34 is used to apply a reverse bias to each of the diodes 21 and 22. A bypass capacitor 35 is connected across the battery 34 to prevent transient signals from changing the bias points of the diodes 21 and 22. Control signals from a control source 36 are applied to the oscillator circuit 20 via a resistance element 37 connected to the center-tap of the winding 26. The control source 36 is provided with a ground connection.

In operation, the circuit 20 oscillates at a desired multiple, which term as used herein includes a sub-multiple or the fundamental of the supply frequency. In the embodiments of the present invention using variable capacity diodes, the circuit 20 is tuned to resonate at the second subharmonic (the ½ frequency) of the A.C. supply because the efficiency of energy conversion between the supply and the circuit output is highest at this frequency. The diodes 21 and 22 exhibit a non-linear capacity when biased in the reverse direction. The transformer 25 provides the linear reactance. The control source 36 is operated to apply control signals of either phase and of the (½) frequency to the oscillator circuit 20. Once the circuit oscillations are started, the circuit continues to oscillate even when the control signals are removed and so long as the A.C. supply is maintained.

Other forms of parametric oscillator circuits may be used in the present invention. In the circuit 20' of FIG. 2, the diodes 21' and 22' each are connected to ground by means of a separate reverse bias source, such as the batteries 38 and 39. The linear reactance is provided by an inductance element 40 connected between the center-tap of the secondary winding 41 of a supply transformer 42 and ground. The end terminals of the secondary winding 41 are connected, respectively, to the cathode and anode of the diodes 21' and 22'. The A.C. supply source 30 is coupled to the primary winding 43 of the supply transformer 42. Control signals are applied in series with a resistance element 43 to the ungrounded end terminal 44 of the inductance 40. The output signals of the circuit 20' are taken by way of a resistance element 45 connected to the end terminal 44 of the inductance 40.

The operation of the circuit 20' of FIG. 2 is essentially the same as that described above for the circuit 20 of FIG. 1.

Other known forms of parametric oscillator circuits may be used, for example, one using a pair of ferromagnetic cores connected in a balanced circuit with a linear capacitor.

As shown by the characteristic curve 40 of FIG. 3, the parametric oscillator circuit 20 exhibits three distinct response regions, designated I, II and III, over different ranges of supply voltage. The curve 40 is a plot of output voltage amplitude at frequency $f$ as a function of supply voltage amplitude at frequency $2f$. In plotting the curve 40, the supply frequency $2f$ and the circuit tuning are held constant. In region I, between the points $o$ and $e$ along the abscissa, the circuit 20 is not oscillating and no output is produced. In region II, between the points $a$, $b$, $d$, $e$, the circuit 20 may or may not be oscillating. In going from the point $o$, toward point $c$ along the abscissa, the circuit remains non-oscillating until the point $a$ is reached when it suddenly jumps into oscillation with an amplitude indicated by the ordinate $b$ of the curve. In region III, between the points $a$, $b$, $c$, the circuit is always oscillating; the ordinate again indicating amplitude. In going from the point $c$ toward $o$, the circuit remains oscillating until the point $d$ is reached when the circuit ceases oscillation and the ordinate returns to $e$. Thus, the curve is one having a hysteresis effect in the region II. Normally, the supply voltage when present is of an amplitude, say S1, sufficient to bring the circuit operation into region III to produce a maximum output voltage.

However, for reasons described more fully hereinafter, the supply voltage may be modulated below the value S1 to a lower value, say that represented by the point S2 of region II. Note, however, that the circuit remains oscillating in reducing the supply amplitude from S1 to S2.

The information is represented by the phase in which the circuit oscillations take place. In the present invention, two phases are of interest. One of these two phases corresponds to oscillations in the same phase as a standard reference signal, and the other of the two phases corresponds to oscillations 180° out of phase with the standard reference signal. Thus, when a circuit 20 is oscillating, it is storing either one or the other of the two binary digits "1" and "0" corresponding respectively to the one and the other phases.

FIG. 4 is a symbolic diagram of a parametric oscillator circuit 20. The non-linear reactance elements are represented by the half-circle line 50, and the linear reactance element is represented by the capacitor 51 connected across the circular line 50. The A.C. supply source coupling is represented by the rectangle 52. The control signal coupling is represented by a resistor 53 connected at a junction 54 between the circular line 50 and the capacitor 51. A number of different control signals may be coupled to the junction 54 as represented by the additional control resistor 55. One manner of output signal coupling is represented by the resistor 56 connected to the junction 54.

In the circuits of the present invention, a transformer conveniently is used to read out the information stored in the oscillator circuit 20. The transformer read-out coupling is shown in FIG. 4 by the separate read-out winding 57 adjacent to the curved line 50. The read-out winding is connected in a series read-out circuit 58 including a pair of selecting windings 59, 60, a back-biased diode 61 and an output resistor 62. One terminal 57*a* of the read-out winding 57 is connected to ground via the diode 61, a first selecting winding 59 of the pair 59, 60 of selecting windings, and a reverse bias source for the diode 61, such as a battery 63. The other terminal 57*b* of the read-out winding 57 is connected to ground via the second selecting winding 60 and the output resistor 62. A first selecting source 64 is transformer coupled by means of a transformer 65 having the first selecting winding 59 as its secondary and having a primary winding 66 connected to the output of the first selecting source 64. A second selecting source 68 is transformer coupled to the second selecting winding 60 by means of a second transformer 67 having the second selecting winding 60 as its secondary and having a primary winding 69 connected to the output of the second selecting source 68. The output signals are taken across the output resistor 62.

The series read-out circuit 58' of FIG. 5 is similar to the read-out circuit of FIG. 4 except that a break-down diode 70 is connected between the terminal 57*a* of the read-out winding 57 and the first selecting winding 59, and the diode 63 and bias source 63 of FIG. 4 are not used.

In operation, the oscillator circuit 20 of FIG. 4 is operating in either one or the other of the two phases. The voltage produced across the read-out winding alternately drives the diode 61 towards and away from its conducting condition. The reverse bias source 63, however, is of sufficient amplitude to overcome the voltage applied to the read-out winding 57 and maintain the diode 61 non-conducting. Thus, substantially no current flow is produced in the read-out circuit 58 due to the induced read-out voltage alone. Assume, now, that the first and second selecting sources 64 and 68 are operated to apply selecting signals in phase with the read-out signals coupled from the oscillator 20 to the read-out winding 57. Now the diode 61 becomes conductive during one-half cycle of each oscillation. Thus, during, say the positive half-cycle, the signals from the first selecting source 64 are in a direction to produce a voltage in the first selecting winding 59 which is positive at the anode of the diode 61, and the signals from the second selecting source 68 are in a direction to produce a voltage in the second selecting winding 61 which is negative at the cathode of the diode 61. The net voltage applied across the series circuit 58 is of sufficient amplitude to overcome the battery 63 voltage and to make the diode 61 conductive. Each time the diode 61 conducts, the resulting current flow causes an output voltage to appear across the output resistor 62.

During the other half-cycle of each oscillation, the signals produced across the various windings of the series circuit 58 are of the opposite polarity and the diode 61 is again driven to non-conduction.

Observe that when only one of the pair of selecting sources 64 and 68 is operated, insufficient voltage is produced across the series circuit 58 to cause the diode 61 to become conductive. Thus, when both the selecting sources 64 and 68 are operated at the same time and in the same one phase and when the oscillator 20 is operating in the same one phase, output signals are produced across the output resistor 62. These output signals appear as unidirectional pulses due to the diode 61 conducting only in one direction. When both selecting sources 64 and 68 are operated in the same one phase and when the oscillator 20 is operating in the opposite phase, the diode 61 remains non-conductive and no output signals are produced. Thus, the presence or the absence of output signals during a selecting operation correspond respectively to the read-out of the one or the other of the two binary digits stored in the oscillator 20. The waveform 72 of FIG. 4 represents the output signals produced when the oscillator is operating in one phase, say corresponding to a binary "1." Absence of an output indicated by the line 73 of FIG. 4 represents the output produced when the oscillator circuit 20 is operating in the phase corresponding to a binary "0." As many read-outs of the stored information as desired can be made without changing the information stored in the oscillator 20. This non-destructive read-out provides advantages in certain information handling operations involving repeated reading of the same memory location.

The operation of the circuit of FIG. 5 is similar to that of FIG. 4 except that the break-down diode 70 becomes conducting during both half-cycles of each oscillation. Thus, output pulses of both polarities, as indicated by the line 75 of FIG. 5, are produced when the oscillator 20 is operating in the one phase, corresponding to the binary "1." Line 76 of FIG. 5 indicates the absence of an output produced when the oscillator 20 is operating in the opposite phase, corresponding to the binary "0."

Another read-out circuit for the parametric oscillator circuit is shown in FIG. 6 using the first selecting winding 60 in conjunction with the read-out winding 57. Normally, the circuit of FIG. 6 is operating such that the output voltage is below the maximum point *m* of FIG. 3. For example, the oscillations may be in region II using an A.C. supply voltage S2 to cause a normal output voltage of amplitude *n*. The output voltage of amplitude *n* induced in the read-out winding 57 is of insufficient amplitude to cause the break-down diode 70 to become conductive. Also, the combined read-out voltage *n* and the first selecting voltage are insufficient to cause conduction of the break-down diode 70.

When it is desired to read out the stored information, a read-out signal is applied to the A.C. supply source 30' to increase the amplitude of the A.C. supply to change the output of the oscillator circuit to that represented by the point *m* of FIG. 3. In practice, certain of the parametric oscillator circuits exhibit as much as 20% or more voltage increase between the points *n* and *m* of FIG. 3. The interrogating pulse is represented in FIG. 6 by the positive pulse 77 applied to the A.C. supply source 30'. Now, the increased amplitude signals induced in the read-out winding 57 together with the first selecting signals are of sufficient amplitude to cause the break-down diode 70 to conduct. Accordingly, an output signal is or is not produced across the output resistor 62 depending upon whether the oscillator 20 is operating in the same phase as, or in the opposite phase from the first selecting signals. If the oscillator circuit is operating in the same phase, a relatively large amplitude output is produced, and when the oscillator circuit is operating in the opposite phase, substantially no output is produced. A plurality of the oscillator circuits 20 may be arranged in a random access memory in the manner shown for the 3 x 3 array 80 of FIG. 7. Each of the oscillator circuits 20 has a separate read-out winding 57 and a separate diode 61. A different one of three row selecting windings 82 is connected at the anodes of the diode 61 of each different row. A common bias source such as the battery 84 is connected in parallel with all the row selecting windings 82 to apply a reverse bias to all the diodes 61. A different one of three column selecting windings 86 is connected to the terminals 57*a* of the reading winding 57 of each different column. The column selecting windings 86 are all connected to ground via a common output resistor 88. A sensing device 90 is connected across the output resistor 88. A row read switch 92 is used to selectively excite a desired one of the row selecting windings 82. Three outputs of the row read switch 92 are transformer coupled via three row transformers 94 to the three row selecting windings 82. The primary windings 96 of the transformers 94 are respectively connected to the three outputs of the row read switch 92. Signals are applied to a desired one of the column selecting windings 86 by three outputs of a column read switch 98. The three outputs of the column read switch 98 are transformer coupled by means of transformers 100 to the three column selecting windings 86. The three primary windings 102 of the column transformers 100 are connected to the three outputs of the column read switch 98. A common A.C. supply source 102 is coupled to all the oscillator circuits 20. A desired one of the oscillator circuits 20 is set into the one or the other of the two phases by means of a row-write switch 104 and a column-write switch 106. Each of the row and column write switches 104 and 106 has three outputs resistor coupled to the oscillator circuits 20 of the three rows and three columns, respectively.

In operation, the oscillator circuits 20 are all normally oscillating in either one or the other of the two phases. In the absence of reading signals applied by the row and column read switches 92 and 98, each of the diodes 61 is in its non-conductive condition and no currents flow in the respective reading circuits. A desired one of the oscillator circuits 20 can be set to a desired phase by concurrently operating the row and column write switches 104 and 106 to apply signals of the desired phase to the row and column write lines connected to the desired oscillator 20. Upon termination of the row and column write signals from the switches 104 and 106, the desired oscillator circuit 20 is operating in the desired phase. The coincident switching of an oscillator circuit 20 using control signals is described in copending application, Serial No. 767,673 entitled "Switching Systems," and filed October 16, 1958, by the present applicants.

The information stored in a desired one of the oscillator circuits 20 is determined by concurrently operating the row and column read switches 92 and 98 to apply signals of the standard phase to the row selecting winding 82 and the column selecting winding 86 which are coupled to the selected oscillator circuit 20. As described above, if the circuit 20 is operating in the standard phase, the diode 61 of that oscillator circuit becomes conductive. The resulting read-out current flows from ground through the output resistor 88, the column selecting winding 86, the read-out winding 57 and the diode 61 of the selected oscillator 20, the row selecting winding 82, and then through the bias source 84 to ground. The rectified voltage appearing across the output resistor 88 is applied to the sensing device 90. The sensing device 90 may be any suitable device responsive to the presence or the absence of an output signal during the application of the read signals from the row and column read switches 92 and 98. If desired, the sensing device 90 may be provided with an additional strobe input. If the selected oscillator circuit 20 is operating in the opposite phase, the diode 61 of that oscillator 20 remains non-conductive and no output appears across the output resistor 88. As many read-outs of the same oscillator circuit 20 or of any other selected one of the oscillator circuits 20 can be accomplished in similar manner. The memory system 80 of FIG. 7 may be modified to use the read-out circuit 58′ of FIG. 5 by replacing the unidirectional conducting diodes 61 with the break-down diodes 70 of FIG. 5 and short-circuiting the bias battery 84 to ground. The operation of the memory system 80 using break-down diodes is similar to that just described except alternating polarity pulses appear across the output resistor 88 when the selecting oscillator 20 is operating in the standard phase and no output is produced when the selected oscillator 20 is operating in the opposite phase.

The memory system 80 of FIG. 7 also may be modified to use the read-out circuit of FIG. 6 by arranging the A.C. supply source 103 to normally apply a voltage S2 and then to apply the voltage S1 during the reading operation. In such case, the row and column read signals may be of relatively smaller amplitude than when the reading circuits of FIGS. 4 and 5 are used.

There have been described herein improved methods of and apparatus for storing information using parametric oscillator circuits. Two different reading circuits have been described, one using unidirectional conducting diodes and the other using break-down diodes. In each case, selected control signals of proper phase are applied from two different sources concurrently with the output from the selected oscillator 20. The diodes become conductive when and only when the oscillator circuit 20 is operating in the same phase as the applied selecting signals. The 3 x 3 array of FIG. 6 is illustrative only, and other different memory systems may be provided, for example, an $n$ x $m$ array with $n \neq m$, a hexagonal array, and so forth.

What is claimed is:

1. A read-out circuit for a parametric oscillator circuit comprising a read-out winding having a first and a second terminal and coupled to said oscillator circuit, the two phases of oscillation of said circuit respectively corresponding to the two binary digits, a common reference point, a non-linear impedance device and a first selecting winding connected in that order from said first terminal to said common reference point, a second selecting winding and a linear impedance element connected in series with each other between said second terminal and said reference point, and means for applying to said first and second selecting windings A.C. signals of one of said two phases.

2. A read-out circuit as claimed in claim 1, wherein said non-linear device is a diode rectifier, and said circuit further includes means for applying a reverse bias to said diode rectifier.

3. A read-out circuit as claimed in claim 1, wherein said non-linear device is a break-down diode.

4. A read-out circuit for a parametric oscillator wherein the two phases of oscillation respectively correspond to the two binary digits, said read-out circuit comprising a read-out winding having first and second terminals and coupled to said oscillator, a linear element and a selecting winding connected to said first terminal, a non-linear element connected to said second terminal, and said readout and selecting windings and said linear and non-linear elements being connected to each other in a series circuit.

5. A read-out circuit as claimed in claim 4 including means for applying a selecting signal of one of said phases to said selecting winding, said oscillator having an A.C. supply, and means for modulating said A.C. supply to increase the amplitude of the output signal produced across said read-out winding.

6. A read-out circuit as claimed in claim 4, wherein said non-linear element is a unidirectional conducting device, said circuit having means to reverse bias said unidirectional conducting device, and wherein said linear impedance is an electrical resistor.

7. A memory system comprising a plurality of parametric oscillator circuits arranged in rows and columns, selecting means coupled to said rows and columns for setting a desired one of said circuits to a desired one of two phases, and read-out means comprising a separate read-out winding having a first and second terminal and coupled to each different one of said circuits, a first plurality of selecting windings each connecting all the said first terminals of the said read-out windings of a different one of said rows, a second plurality of selecting windings each connecting all the said second terminals of the said read-out windings of a different one of said columns, a plurality of rectifying devices each connected between one of the said terminals of each different said read-out winding and one of said first and second selecting windings, and output means connected to all the selecting windings of one of said first and second pluralities of selecting windings.

8. A memory system as claimed in claim 7, said output means comprises an impedance element, and a bias means connected to all the selecting windings of the other of said first and second pluralities of selecting windings for applying a reverse bias to said rectifying devices.

9. A memory system as claimed in claim 8, wherein said rectifying devices are break-down diodes.

References Cited in the file of this patent

UNITED STATES PATENTS

| | | |
|---|---|---|
| 2,028,880 | Runge et al. | Jan. 28, 1936 |
| 2,633,557 | Cabes | Mar. 31, 1953 |
| 2,691,151 | Toulan | Oct. 5, 1954 |
| 2,698,392 | Herman | Dec. 28, 1954 |
| 2,722,605 | Mills et al. | Nov. 1, 1955 |
| 2,773,444 | Whitney | Dec. 11, 1956 |
| 2,781,489 | Petrides | Feb. 12, 1957 |
| 2,815,488 | Von Neumann | Dec. 3, 1957 |
| 2,823,368 | Avery | Feb. 11, 1958 |
| 2,823,369 | Haug et al. | Feb. 11, 1958 |
| 2,854,651 | Kircher | Sept. 30, 1958 |
| 2,875,404 | Handel | Feb. 24, 1959 |
| 2,894,214 | Touraton | July 7, 1959 |
| 2,934,706 | Johnson et al. | Apr. 26, 1960 |
| 2,946,043 | Reenstra et al. | July 19, 1960 |
| 2,997,694 | Thompson | Aug. 22, 1961 |
| 3,005,976 | Anderson | Oct. 24, 1961 |
| 3,015,038 | Takahasi et al. | Dec. 26, 1961 |

FOREIGN PATENTS

| | | |
|---|---|---|
| 762,057 | Great Britain | Nov. 21, 1956 |
| 769,384 | Great Britain | Mar. 6, 1957 |
| 778,883 | Great Britain | July 10, 1957 |

OTHER REFERENCES

Proceedings of I.R.E., May 1957, pp. 656–661 (by Doely et al.). (Copy in Sci. Lib. and class 178–66.)

Radio-Electronic Engineering, April 1953, pp. 8–10 (by Kauke).